Figure 2:
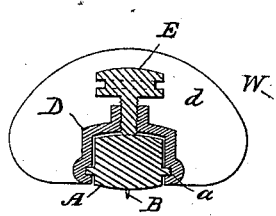
Figure 1:
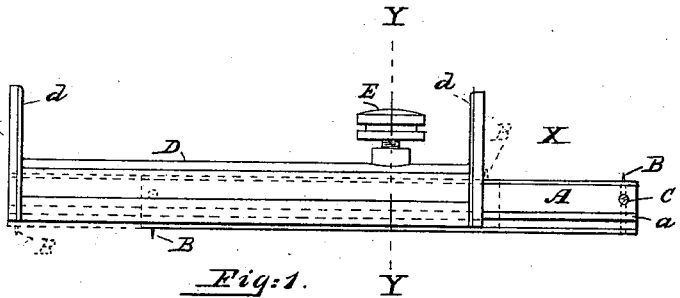
Figure 3:
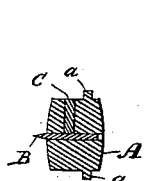
Figure 4:
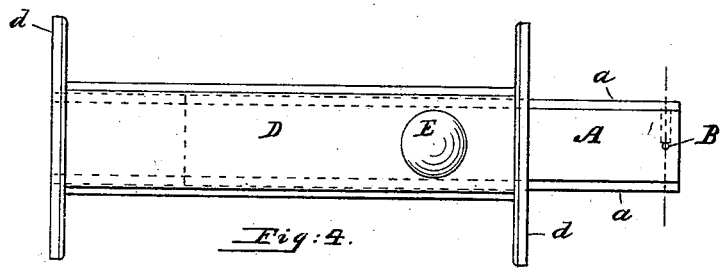
Figure 5:
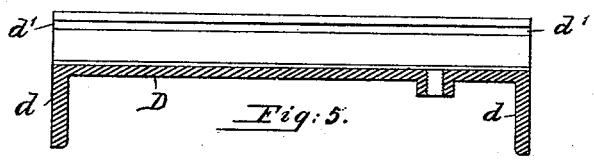

(No Model.)

G. S. FORREST.
DOUBLE HEADED GAGE.

No. 297,371. Patented Apr. 22, 1884.

Witnesses.
Q. W. Abbott
F. A. Merrill

Inventor.
G. S. Forrest.
per J. B. Thurston
Attorney.

N. PETERS, Photo-Lithographer, Washington, D. C.